Sept. 26, 1967    J. F. OURY ETAL    3,343,651
APPARATUS FOR DISTRIBUTING CONCRETE MIX
Filed Aug. 25, 1966    10 Sheets-Sheet 1
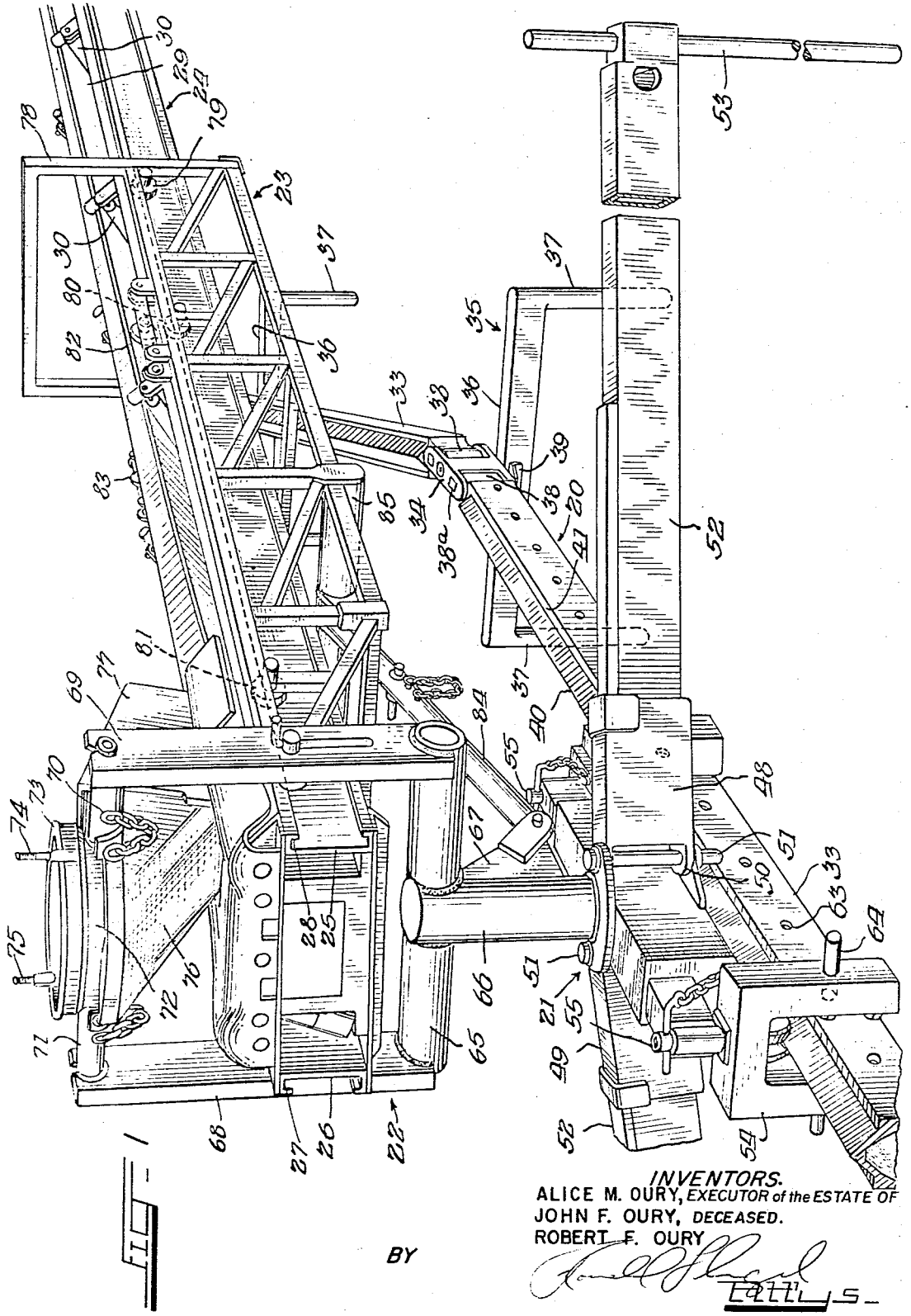
INVENTORS.
ALICE M. OURY, EXECUTOR of the ESTATE OF
JOHN F. OURY, DECEASED.
ROBERT F. OURY
BY

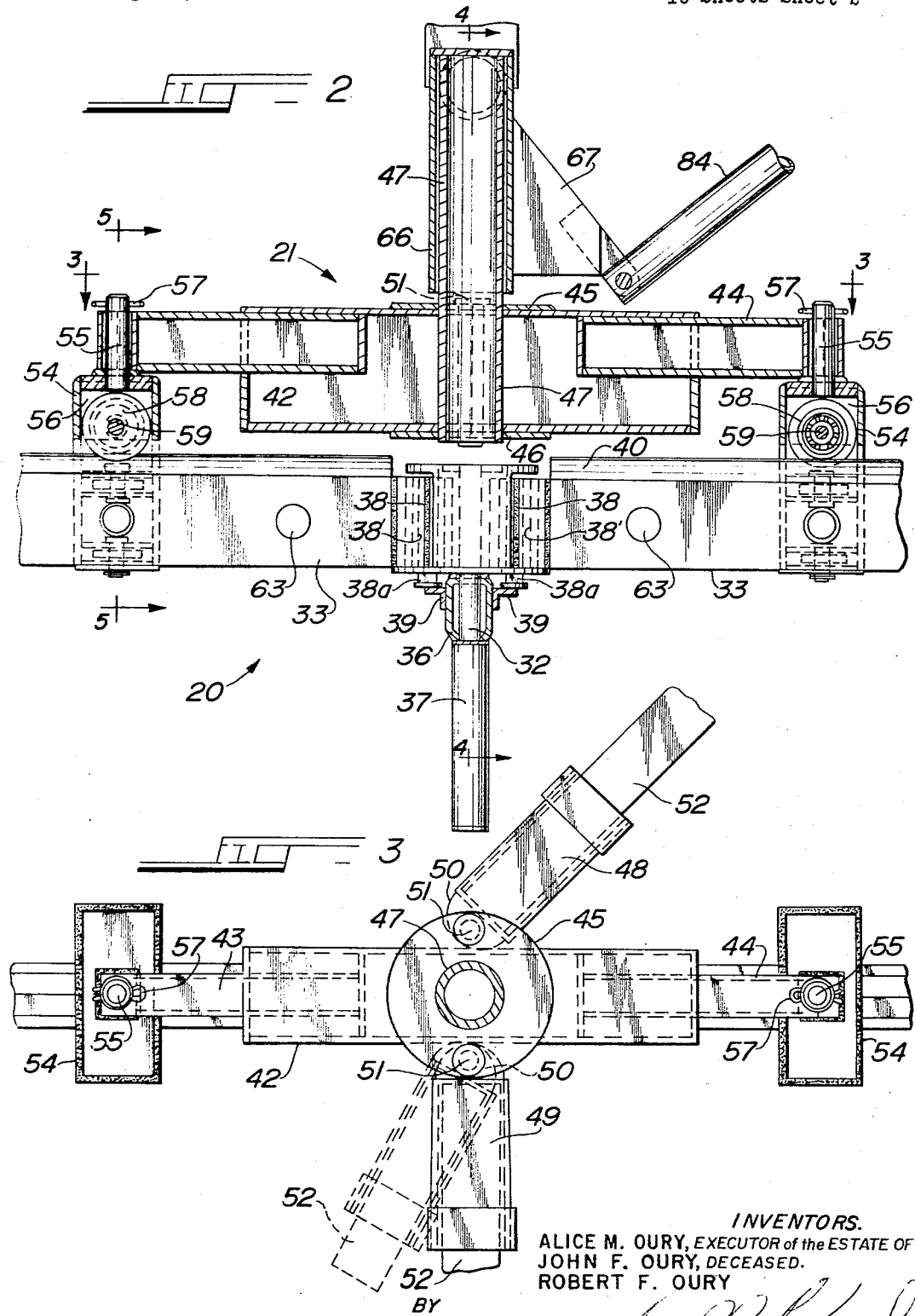

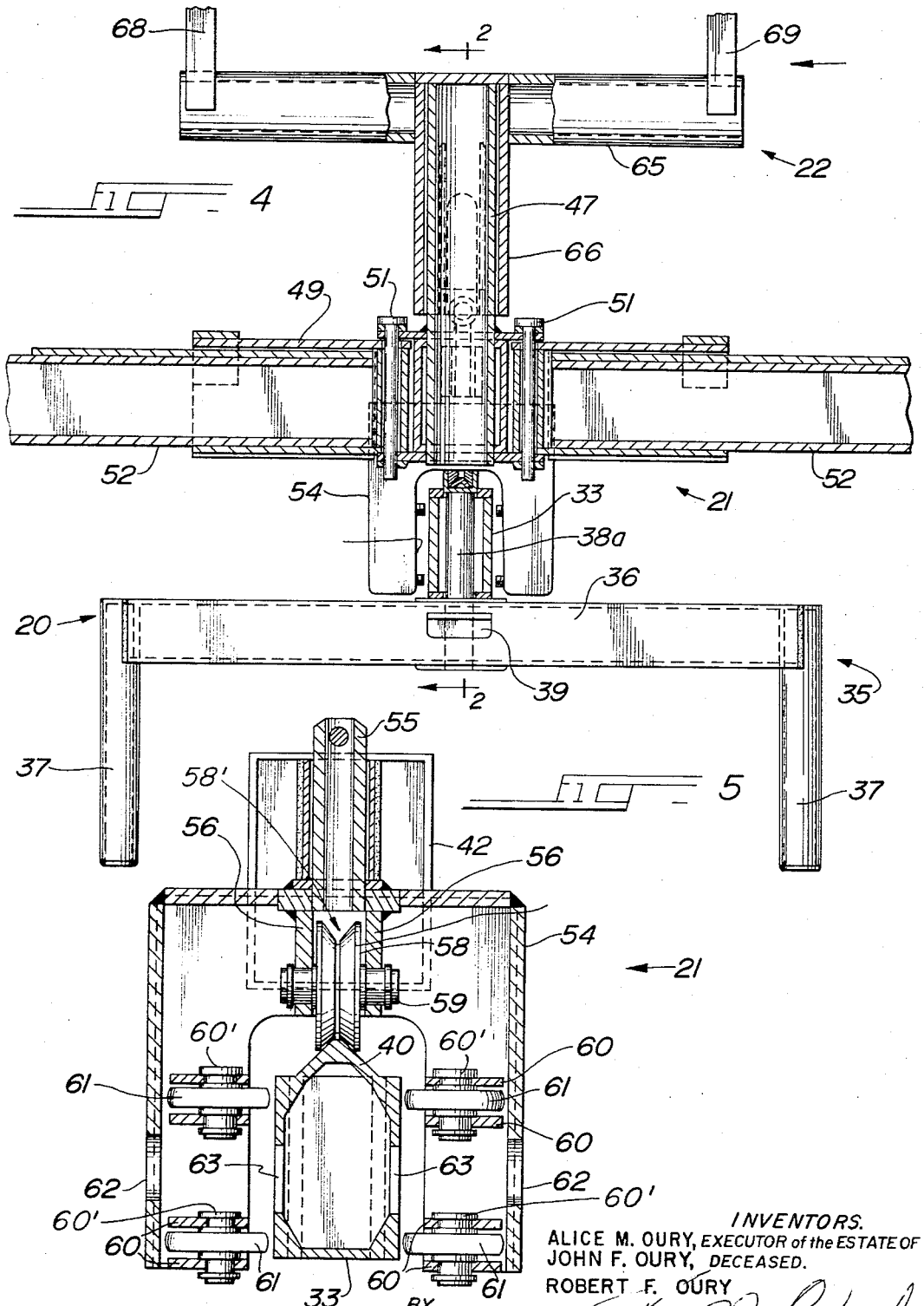

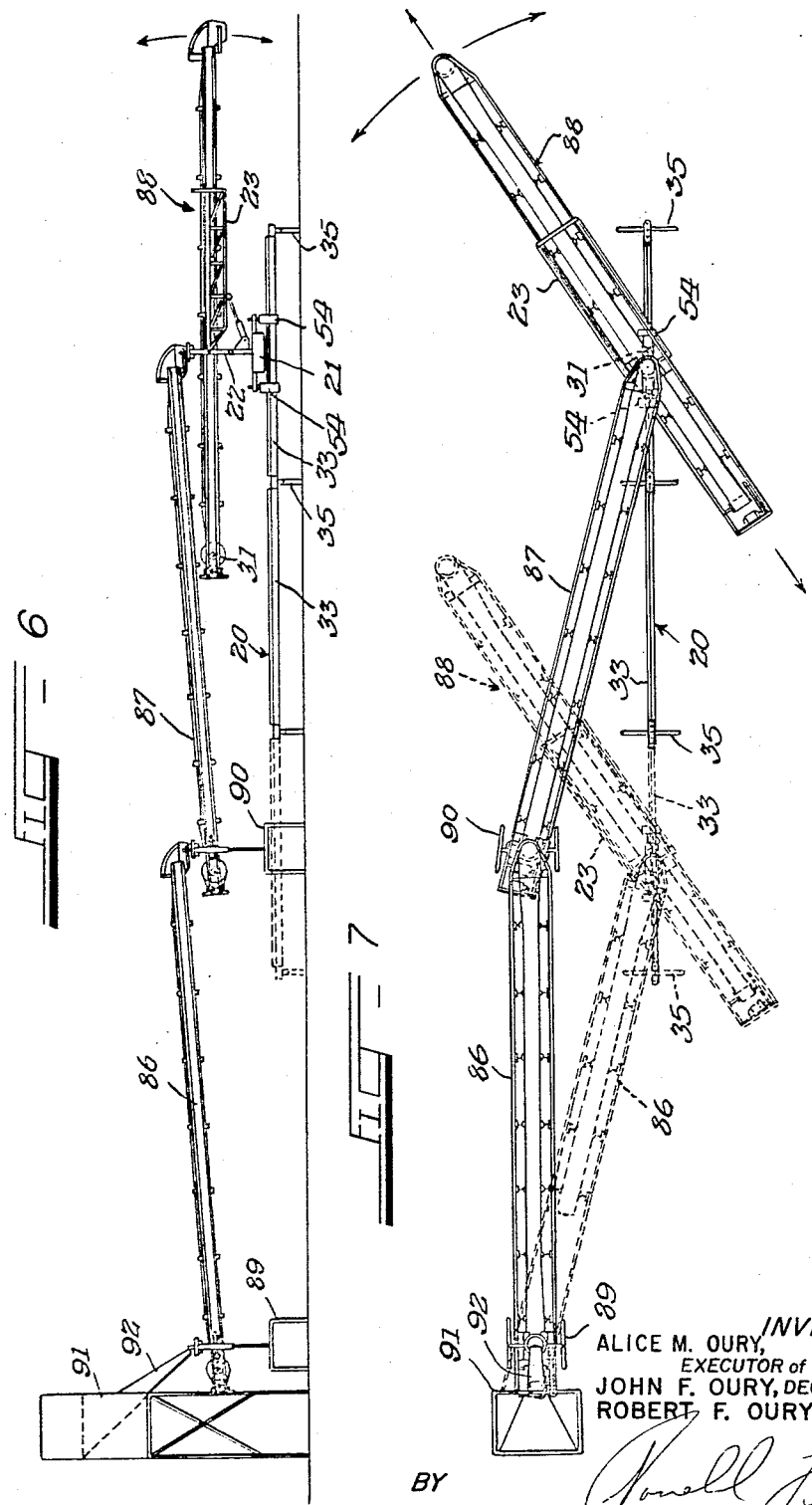

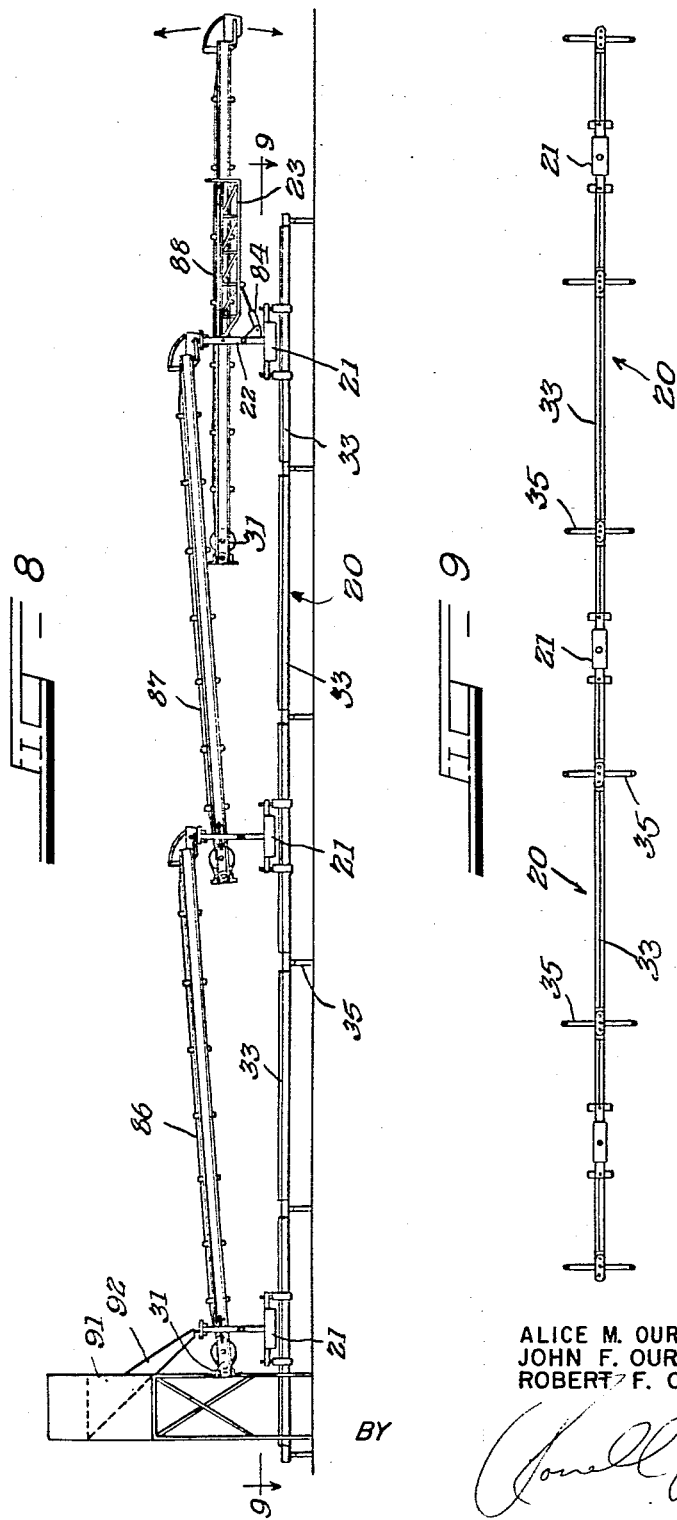

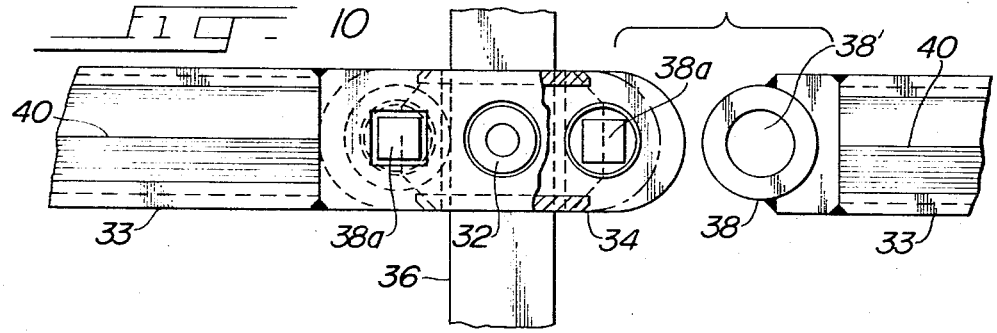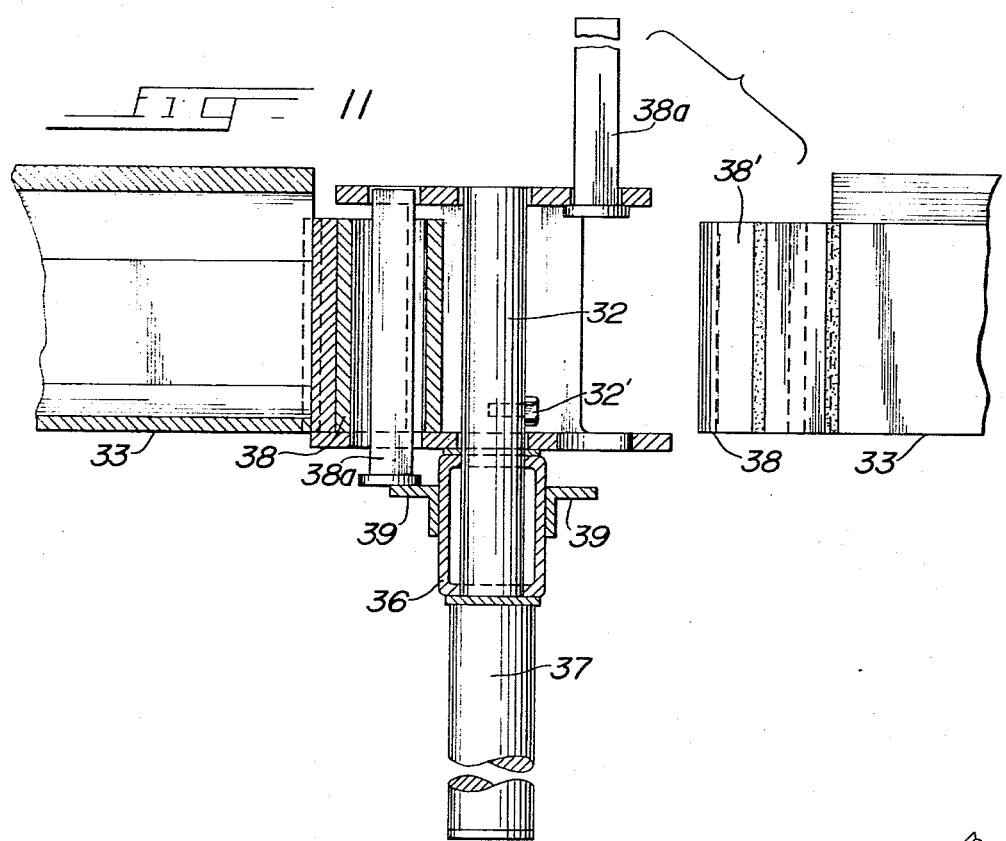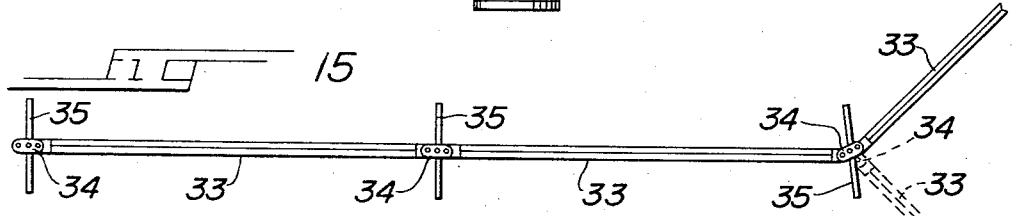

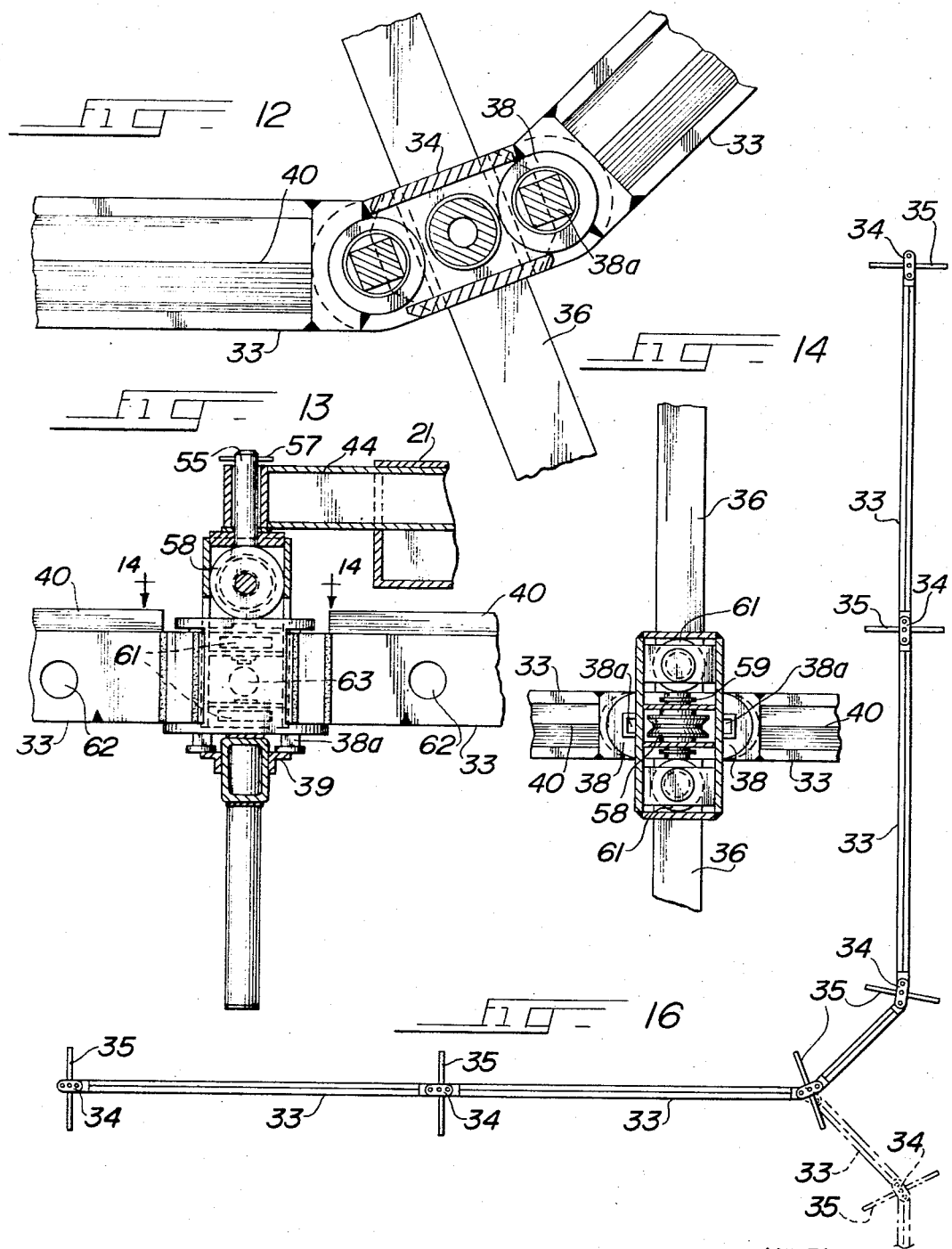

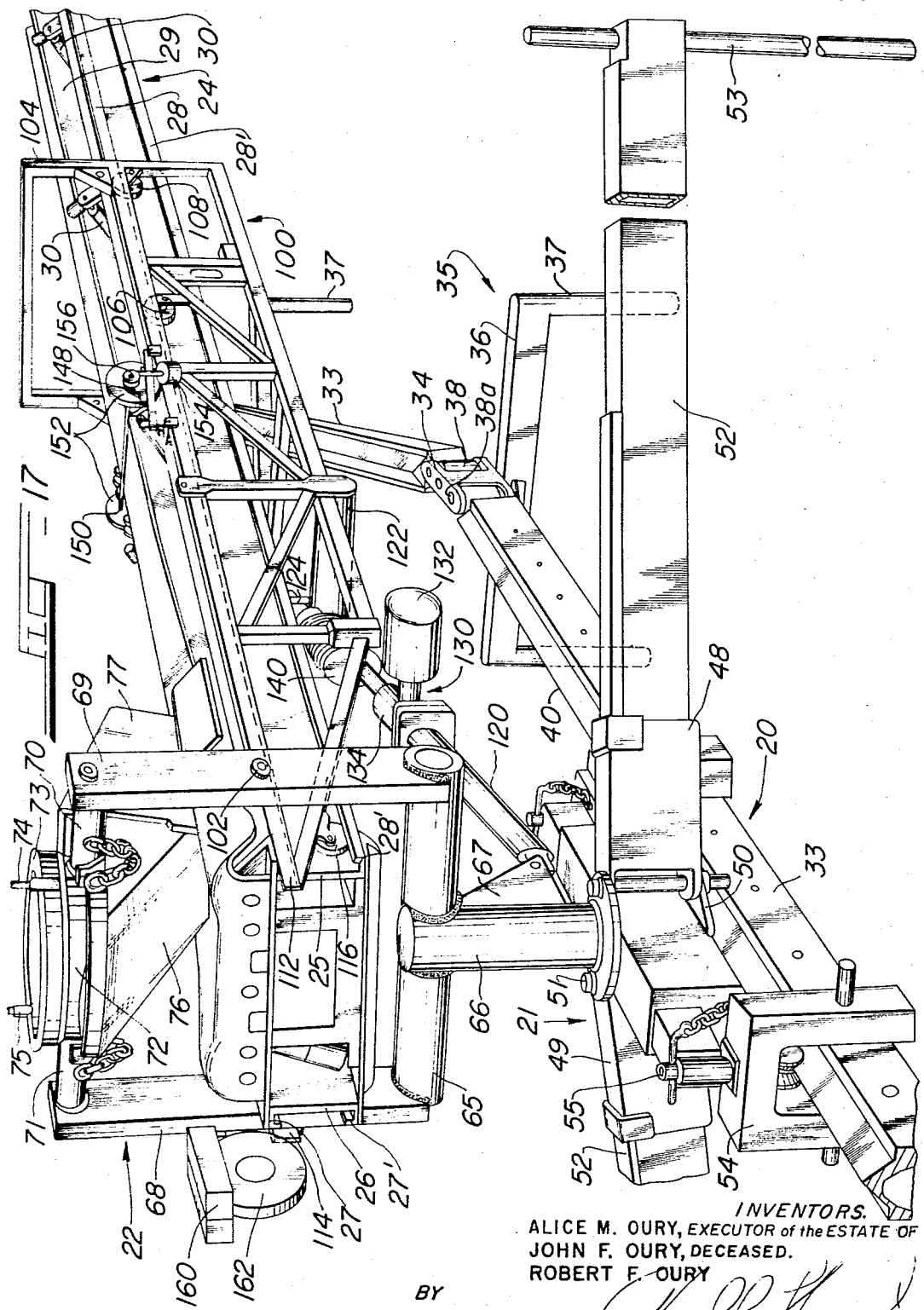

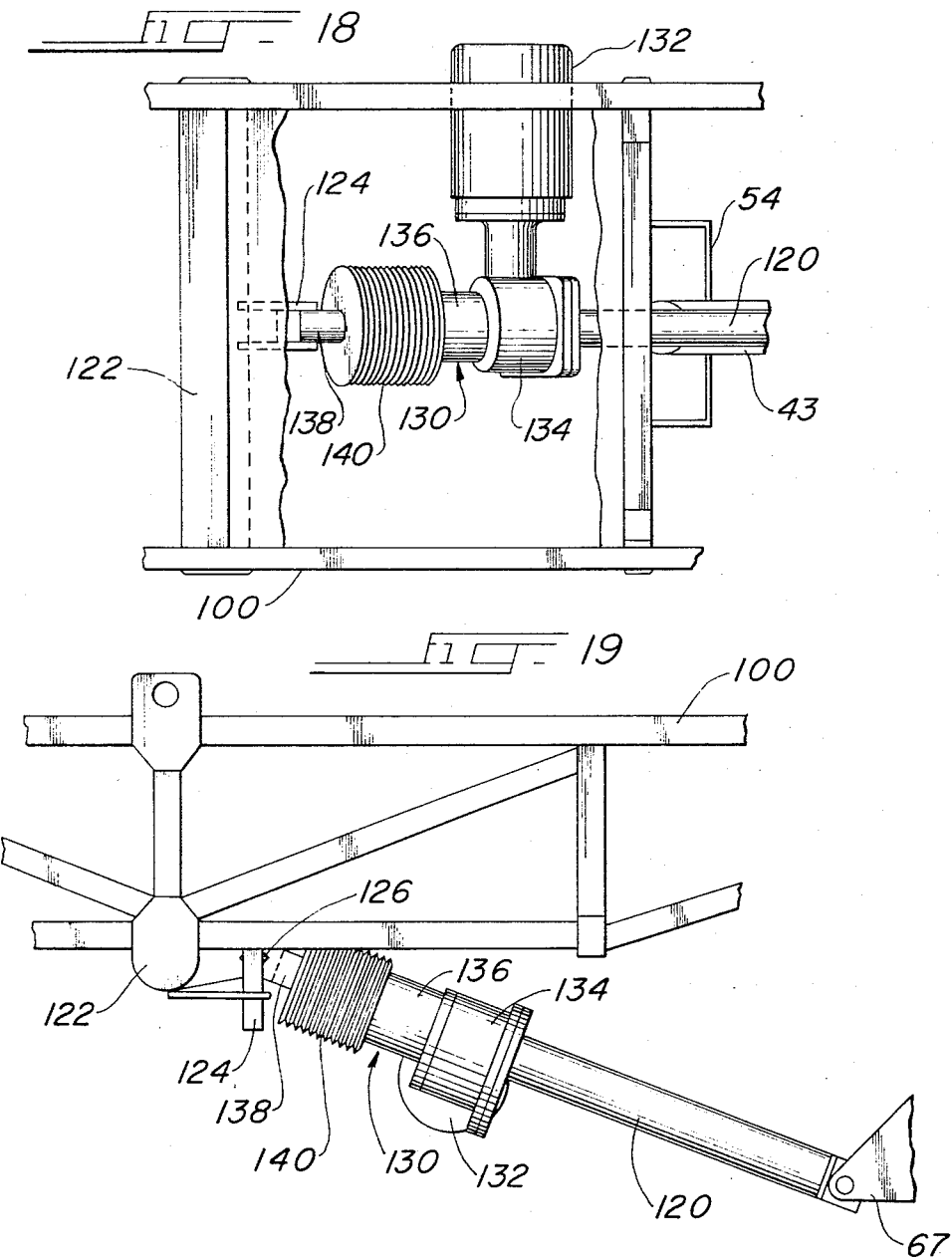

Sept. 26, 1967 J. F. OURY ETAL 3,343,651
APPARATUS FOR DISTRIBUTING CONCRETE MIX
Filed Aug. 25, 1966 10 Sheets—Sheet 10
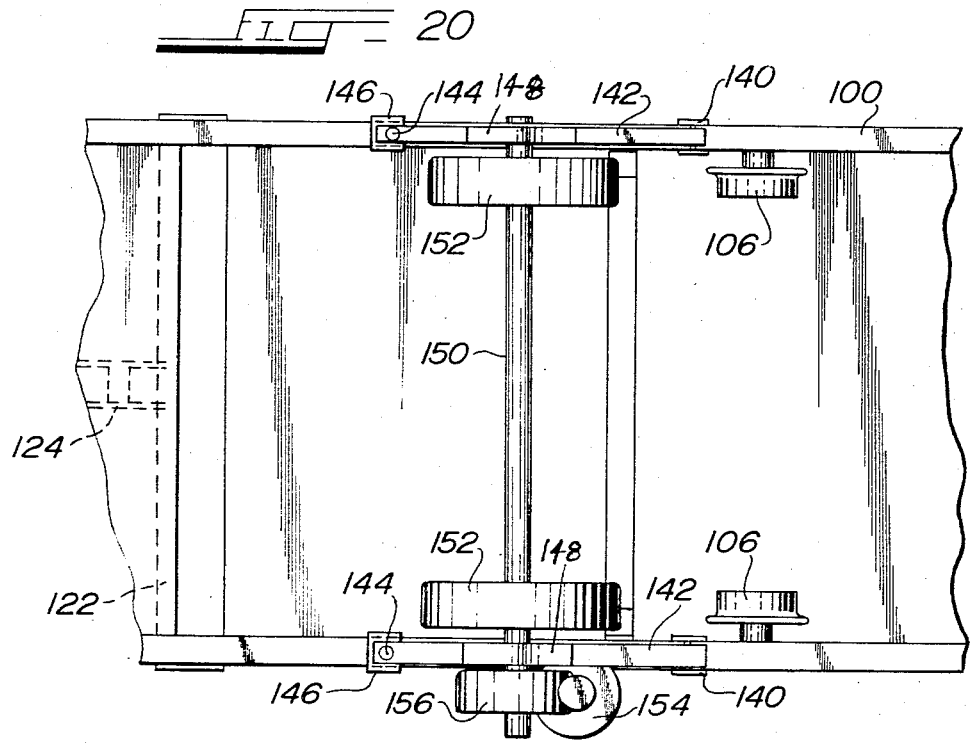
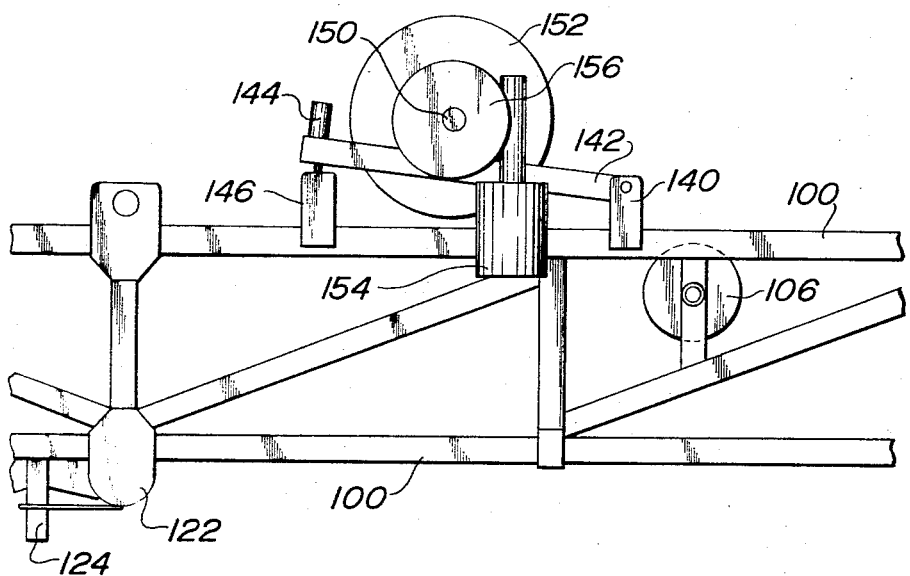
INVENTORS.
ALICE M. OURY, EXECUTOR of the ESTATE OF
JOHN F. OURY, DECEASED.
ROBERT F. OURY
BY United States Patent Office 3,343,651
Patented Sept. 26, 1967

3,343,651
APPARATUS FOR DISTRIBUTING
CONCRETE MIX
John F. Oury, deceased, late of Wheaton, Ill., by Alice M. Oury, acting as executor, Wheaton, Ill., and Robert F. Oury, Wayne, Ill., assignors to Oury Engineering Company, Elmhurst, Ill., a corporation of Delaware
Filed Aug. 25, 1966, Ser. No. 575,503
27 Claims. (Cl. 198—118)

ABSTRACT OF THE DISCLOSURE

This application describes a device for transporting concrete mix and the like featuring a track system, with a carriage being movably mounted on the track system, as by caster assemblies interposed between the carriage and adapted to ride on the track. A support frame assembly is provided, and a frame mounting structure (e.g., a yoke) mounts the support frame assembly in a cantilever fashion on the carriage for pivotal movements about horizontal and vertical axes. Conveyor means are disposed on the support frame for longitudinal telescoping movements thereon.

The track system disclosed embodies a series of support members, with rails extending in end-to-end relationship between adjacent support members, link means being provided on each rail support member and having pivotal connections between ends of juxtaposed rail members. The carriage is preferably designed to ride on the track arrangement via a pair of caster housings which are pivotally mounted on the carriage frame, with a caster being provided in each caster housing and adapted to engage the top surface of the track. In addition, opposed side guide rollers are provided in each caster housing and serve to prevent misalignment of the casters with reference to the track. The overall system further employs outriggers in order to generally stabilize the entire arrangement in a vertically oriented position.

---

This application is a continuation-in-part of co-pending Oury et al. United States patent applications Ser. No. 426,134, filed Jan. 18, 1965, now abandoned, and Ser. No. 491,768, filed Sept. 30, 1965, now abandoned.

The present invention generally relates to apparatus for distributing concrete mix and more particularly to apparatus for distributing concrete mix at the terminal end of a concrete mix conveying system.

Conveyors have found increasing usefulness in concrete work. As illustrated in Oury et al. United States Patent No. 3,151,732, granted Oct. 6, 1964, a number of conveyors may be employed to move the concrete from a mixer to the location at which it is to be laid. The terminal conveyor is movably mounted so that the concrete can be distributed over a wide area.

In previous systems the discharge end of the terminal conveyor was supported by movable stands, an arrangement which has many disadvantages. Often the area surrounding the discharge end of the terminal conveyor does not provide adequate footing to support a stand. In some locations, even if an area to mount the stand could be provided, there is not adequate area in which to move the stand in order to distribute the concrete mix.

It is, therefore, a primary object of the present invention to provide an apparatus for a distributing conveyor that can be maneuvered to cover a wide area with the discharging concrete mix. It is a further object of the invention to provide a conveyor device that is adaptable to the variety of locations encountered in construction work. It is a still further object of the invention to provide a distributing conveyor that can be employed in otherwise prohibitive locations in which it is difficult to support the discharge end of the distributing conveyor for movements necessary to cover the area. It is yet a further object of the invention to eliminate the necessity for laborers carrying the heavy weight of the discharge end of the distributing conveyor which is objectionable, particularly on jobs in which the reinforcing strut rods are constructed of light materials so that they may be trampled in a manner that would impair their proper function.

A still further object of the invention is to provide a free cantilever support for a discharge conveyor so that the pouring end thereof can swing easily over many job obstructions such as vertically projecting reinforcing rods, anchor bolts, forms, and the like. It is still another object of the invention to provide a distributing conveyor that requires a minimum amount of labor to operate. It is yet another object of the invention to provide a distributing conveyor for the concrete mix that has a larger amount of maneuverability than achieved heretofore. It is a further object of the invention to provide a distributing conveyor that may be readily moved or retracted as the concrete is laid. It is a still further object of the invention to provide a device for buickly and efficiently distributing concrete as it is supplied and discharged at high rates of speed.

Another and further object of the present invention is the provision of a layout series of tracks and conveyor supporting and handling apparatus which can be placed in position prior to a concrete pouring operation and then when ready for use can be used by putting a carriage on the tracks for supporting the conveyor thereby moving the conveyor over a preselected area and depositing concrete mix thereon without the loss of time usually required in placing conveying apparatus in position on a building or on the ground for depositing a concrete mix at the site.

Still another object of the present invention is the provision of apparatus which can be prepared for the handling of a discharge conveyor, thereby enabling the mixing operations to be approximately continuous, thereby resulting in time saving which heretofore has not been possible because usually, when one location has been prepared and the concrete mix poured, the stands must then be removed and preparations made for pouring the concrete in a different location, and thereby avoiding any loss of time in the mixing of the concrete and the transporting of it from point of mixture to the point of use, such that, in laying a track foundation in advance, time is saved both in the handling and in the making of the mix.

Another and further object of the present invention is the provision of a novel cantilever supporting structure for a concrete mix conveyor.

A further object in accordance with the present invention is the provision of power means for controlling the angular level of the conveyor in the supporting structure and for retracting and extending the conveyor within the supporting structure.

These and other objects, advantages, and features of the present invention will hereinafter appear, and, for purposes of illustration, but not of limitation, exemplary embodiments of the present invention are shown in the accompanying drawings, in which:

FIGURE 1 is a perspective view of one embodiment of the present invention, including a conveyor supported in a cantilever fashion, a carriage upon which the conveyor is mounted, track means which support the carriage, and track support means.

FIGURE 2 is a sectional view taken substantially along line 2—2 in FIGURE 4;

FIGURE 3 is a sectional view taken substantially along line 3—3 in FIGURE 2;

FIGURE 4 is a view partially in elevation and partially in section along line 4—4 in FIGURE 2;

FIGURE 5 is a vertical sectional view on line 5—5 of FIGURE 2;

FIGURE 6 is an elevational view showing the combination of two standard conveyor units with a conveyor supported in a cantilever fashion in accordance with the present invention, in combination with track and carriage means;

FIGURE 7 is a plan view of the conveyor combination shown in FIGURE 6;

FIGURE 8 is a side elevational view of a plurality of conveyors mounted on movable carriages on the track means;

FIGURE 9 is a plan view of the track means shown in FIGURE 8;

FIGURE 10 is an exploded top plan view of a portion of the stand and of the rail connecting means;

FIGURE 11 is an exploded view, partially in elevation and partially in section, of the rail connecting means shown in FIGURE 10;

FIGURE 12 is a top view showing the links connecting the rails at an angle to each other;

FIGURE 13 is a vertical view through a portion of the carriage and through connecting means for joining the ends of a pair of rails;

FIGURE 14 is a plan view on line 14—14 of FIGURE 13;

FIGURE 15 is a plan view of a track section showing angular positions of the track;

FIGURE 16 is a plan view showing angular positioning of the track by connecting sections of the track to make turns of 45° and 90° respectively;

FIGURE 17 is a perspective view of another embodiment of the present invention showing a modified conveyor supporting structure and power means for controlling the level of the conveyor and for retracting and extending the conveyor within the supporting structure;

FIGURE 18 is a fragmentary plan view of the embodiment of FIGURE 17 showing the power means for leveling the conveyor;

FIGURE 19 is a fragmentary side elevational view thereof, as viewed from the rear in FIGURE 17;

FIGURE 20 is a fragmentary plan view of the embodiment shown in FIGURE 17 showing the power means for retracting and extending the conveyor; and FIGURE 21 is a fragmentary side elevational view thereof, as viewed from the front in FIGURE 17.

With reference to the drawings, FIGURE 1 shows track means in the form of a monorail track 20. A carriage 21 is movably mounted on track 20, and carriage 21 supports a swing frame in the form of a yoke 22. Yoke 22 has a support frame 23 secured thereto. Supported on the frame 23 is a conveyor 24 having a pair of spaced side supporting members 25, 26 extending the length of the conveyor. The supporting side members 25, 26 have flanges 27, 28 on their upper edges.

An endless V-belt 29 extends the length of the side members 25, 26. A number of upper rollers 30, 30 are provided on opposite sides of the belts 29 and thereby serve to carry the upper flight of the belt in the usual fashion. As shown in FIGURES 6 and 8, the conveyor 24 has a motor 31 mounted thereon, and motor 31 is geared to a drive roller (not shown) by means of which the belt 29 is driven for conveying concrete mix. Conventional rollers (not shown) are provided for carrying the lower flight of belt 29.

Track 20 consists of a series of individual rails 33, 33, which are preferably extended in form. By way of example, rails 33, 33 may conveniently be approximately 16 feet in length, although shorter or longer rail sections may of course be provided. An inverted V-shaped tread 40 is formed along the top edges of each rail 33 for a purpose that will hereinafter appear.

A trunnion is provided at the end of rail 33, and each trunnion 38 extends into a link member 34 which acts as a connector for adjacent rails 33. Each link member 34 is supported by a track stand 35 comprising a top box member 36 and a pair of legs 37 at each of the members 36. A pin 32 extends centrally through each of the link members 34 and passes downwardly into the member 36 of stand 35 and serves to hold the link member 34 in position thereon. Each pin 32 is held in position by a screw 32′ (see FIGURE 11), which serves to hold link members 34 in position on the stands 35, whereby serving to support the rail joint formed by link member 34 and adjacent rails 33, 33. Preferably, the link member 34 is free to pivot relative to its supporting stand 35, but the link member 34 could be rigidly positioned thereon (as by welding) if desired. As a result, link members 34 prevent side slippage of the rails 33 on stands 35. The V-shaped treads 40 along the upper surface of each rail 33 terminate short of link members 34 (i.e., forming a free space gap in the tread 40), for reasons that will hereinafter appear.

A longitudinal opening 38′ is provided through each trunnion 38, and a pin 38a extends through each link member 34 and its associated trunnions 38 thereby serving to hold adjacent rails 33, 33 in position. The lower end of each pin 38a rests on an angle 39 which is attached to member 36 so as to prevent pin 38a from dropping out of position. Pins 38a thus can easily be removed and the rails separated when the tracks are being moved and reset in different locations.

As best shown in FIGURES 1–3, each carriage 21 includes a main longitudinal frame 42 having an extension 43, 44 at each of its ends. A pair of plates 45, 46 are welded to the upper and lower walls respectively of frame 42. A central shaft 47 is welded to the frame 42 and to the plates 45 and 46 as well. Shaft 47 forms a support for yoke 22 to which the support frame 23 is secured as hereinafter described in detail.

A pair of outrigger sleeves 48, 49 are fitted between plates 45, 46 by means of ears 50, 50 on sleeves 48, 49. A pair of pins 51, 51 pass through plate 45, ears 50, and plate 46 in order to provide a pivotable connection between the main frame 42 and the outrigger sleeves 48, 49. A pair of outrigger beams 52, 52 are fitted respectively into the sleeves 48, 49, and beams 52, 52 extend outwardly from the carriage 21. Each beam 52 has an adjustable leg 53 formed at its outer end. The outriggers are used in setting the carriage 21 into position and for maintaining it in a stabilized upright position while in use.

Caster means are provided at each end of carriage 21. The caster means include a pair of housings 54, 54 suspended from extensions 43, 44 upon a pivot post 55, 55. Each pivot post 55 extends into its associated caster housing 54, and a pin 57 extends through the upper end of each post 55 in order to hold the housing 54 in an assembled relation on its associated extension 43, 44. A shaft 59 is provided in each housing 54 and extends through a bracket 56 formed within each housing 54. As best shown in FIGURE 4, an antifriction caster wheel 58, having a V-shaped peripheral groove 58′, is provided on each shaft 59. The V-shaped peripheral groove 58′ of each caster wheel 58 rides the V-shaped tread 40 of each rail 33. Caster wheels 58 also ride over the top surface of links 34 which connect rails 33, 33 together at their ends, as hereinafter described.

As best shown in FIGURES 1, 2, and 5, a plurality of spaced web members 60 are integrally formed with the end walls of each caster housing 54, and upper and lower opposite pairs of rollers 61 are mounted therebetween by means of a series of shafts 60′ (comprising pins mounted between a pair of aligned web members 60). As best shown in FIGURE 5, rollers 61 are normally spaced from the opposite sides of rails 33 but serve to retain the caster 58 associated with a given set of rollers 61 in proper position upon the rails, and also thereby the carriage 21, in the event of any tendency for the caster 58 to be diverted one way or the other from proper alignment upon the V-shaped tread 40 of a given rail 33, as the carriage 21 is moved over the rails in the setting of the device for distributing concrete mix. Also, the rollers 61 that happen to contact the sides of the rails 33 during any such movement prevent binding or jamming between the moving carriage 21 and the stationary rails 33. Each housing 54 has a pair of openings 62 provided in the side thereof, and a plurality of openings 62 are provided in rails 33. As a result, as best shown in FIGURE 1, a pin 64 may be inserted through openings 62, 63 to hold the casters onto the rails in the event that movement of the apparatus should tend to lift the carriage 21 upwardly out of engagement with the rails 33 after the carriage 21 has been placed in the desired position.

As best shown in FIGURES 1, 2, and 4, the yoke 22 comprises a bottom member 65 which is welded to a heavy pipe member 66 intermediate its ends. Pipe member 66 is fitted over the shaft 47 mounted in the carriage frame 42 which in turn serves to support the yoke 22. A bracket 67 is formed on member 66 for purposes hereinafter described. The yoke has spaced side frame members 68, 69 supporting top members 70, 71. Welded to members 70, 71 is a ring shaped member 72. Ring shaped member 72 has a rotary funnel member 73 mounted therein with studs 74 and 75 projecting upward therefrom for engagement with the discharge end of an adjacently mounted conveyor. A chute 76 is shown within which discharge material is received for movement downwardly onto the conveyor belt 29. A splash hood 77 may be fitted over the discharge chute to prevent loose particles from concrete mix being thrown out of the chute while being transferred from one conveyor to the other.

The support frame 23 comprises a trussed structure that extends outwardly from yoke 22. Frame 23 is pivotally attached at its inner end to the side members 68 and 69 of the yoke. A bail 78 is secured to the outer ends of the support frame 23 and extends upwardly from one side thereof and across to the opposite side. A plurality of rollers 79, 80, and 81 are mounted at the upper side of the support frame and are adapted to engage the flange 28 of the side frame 25 of the conveyor. A similar series of rollers is placed at the opposite side of the support frame and engage the upper flange 27 of a conveyor side frame 26 to support the conveyor when it is placed in position in the support frame 23. A top roller 82 opposite the roller 80 is provided, with a similar top roller 83 on the opposite side. These two rollers 82 and 83 are mounted upon brackets, so that they may be pivoted upwardly and brought down into engagement with the upper edges of the side members 24 and 26 of the conveyor. Thus, the conveyor 24 is supported on one side by the series of lower rollers 79, 80, 81 and the corresponding rollers on the other side, and therefore the conveyor 24 is held in projected position from the swing frame in cantilever fashion, that is, conveyor 24 is supported by lower rollers and is prevented from being tilted upwardly by the top rollers 82, 83. The conveyor, therefore, may be projected outward through its full length whether empty or in use without additional support stands or the like to hold it in position. Likewise, the entire conveyor may be moved bodily on the supporting frame and placed in various positions so that the operator only needs to push the conveyor to the desired position on the supporting frame.

A brace 84 is provided which is attached at one end to the bracket 67 at one of its ends and to a cross-brace 85 provided on the support frame 23 at its other end. In order that various degrees of elevation can be obtained with the support frame 23 (e.g., as when the conveyor is used for the elevations of a concrete mix to a height of two or three floors) brace 84 may conveniently take the form of a rod and sleeve arrangement so that the length of brace 84 may be varied.

The conveyors may be placed in relation to each other in accordance with a number of arrangements, as illustrated in the drawings, particularly FIGURES 6–9 inclusive. Various types and kinds of conveyors can be used to convey the mix onto the swing frame conveyor at the discharge end of the line for distributing concrete. This distributing conveyor is used in the laying of the strip of concrete mix because it is self-supporting (i.e., it does not need a stand to support it at its discharge end as do the other conveyors) and because it is both longitudinally and laterally movable.

FIGURE 6 illustrates two conveyors 86 and 87 of the type illustrated in Oury et al. Patent No. 3,151,732, while the distributing conveyor 88 is of the swinging and extending type of the present invention. Stands 89 and 90 are used to support the end portions of the conveyor 86, while the stand 90 is used to support one end portion of the conveyor 87. A hopper 91 is provided having a chute 92 leading therefrom into which a concrete mix is discharged onto the conveyor 86. The concrete mix is conveyed by conveyors 86, 87 to distributing conveyor 88.

A track 20 is shown composed of individual rails 33, 33 and supported by stands 35, 35. The distributing conveyor 88 is supported on movable carriage 21. Carriage 21 includes casters in housings 54, 54 for rolling movements on track 20. Carriage 21 has a yoke 22 extending upwardly to which the support frame 23 is attached and upon which a belt-type conveyor is mounted for conveying the concrete mix to its point of discharge at the location in the final laying of the concrete. The distributing conveyor 88 is supported as hereinabove described in the support frame 23 so that the discharge end of conveyor 88 remains in position without being supported by stands as is the case for the other two conveyors 86, 87.

In FIGURE 7 the conveyors 86, 87, and 88 are shown, with the conveyor 88 angularly disposed to the conveyor 87 and to the track 20. Shown in dotted lines are the conveyors 86 and 88 with a section of track 20 being positioned adjacent the discharge end of the conveyor 86 and the conveyor 87 being removed from the combination (i.e., only two conveyors 86, 88 are being used).

With reference to FIGURES 8 and 9, a different combination is shown in which a straight track is shown composed of individual rails 33, 33 and supported by stands 35, 35 with conveyors such as 86 and 87 which are the same types of conveyors as are shown in FIGURES 6 and 7 except that the yokes for these conveyors are supported by a series of identical carriages 21 which carriages are movable on the track 20 comprising a series of identical rails 33. The distributing conveyor 88 is mounted upon carriage 21. Conveyor 88 is supported by support frame 23, the yoke 22, and by the brace 84, in accordance with the invention described hereinabove.

Operation of the device will now be described. As will be noted from the foregoing description, the apparatus comprises units for performing certain functions desirable for distributing concrete mix with the minimum amount of labor. The tracks are made up of the stands and the rails. Each one of these units can be handled manually by a couple of workmen so far as weight is concerned.

The first step in the use of the equipment is the placing of the tracks in position. The tracks must be positioned somewhat with relation to the task to be accomplished. For example, if a flat slab is to be laid, the tracks should be located consistently with the size, shape, and area attributes of the slab. Likewise, if a heavy foundation is to be built, such as a wall and the like, the tracks should be located so that the cement mix can be discharged at the proper location to move along a wall. Therefore, the setting in place of the stands and the building of the rails thereon to form the tracks is the first step.

The next step is placing in position of the carriage 21, including the outriggers 52, and the leveling and adjusting of the outriggers, so the carriage is in a proper position on the rails. Then, the yoke 22 placed in position on the carriage, and the support frame 23 is fastened to the yoke 22, with the brace 84 inserted in proper position to hold the support frame in extended position on the yoke. Next, the receiving end of the conveyor is inserted through the bail 78 mounted on the free end of the support frame and extending upward therefrom, with the top rails of the conveyor being placed in position so the rollers 79, 80, and 81 are fitted within the flanges 27, 28 of the conveyor side members 25, 26 and under the rollers 82 and 83. In this position the conveyor is counterpoised on the rollers. The rollers at the end of the support frame will support the conveyor while the weight of the forward end will have a tendency to tilt the conveyor upwardly, which movement will be resisted by the rollers 82 and 83. The conveyor is thereby supported in cantilever fashion.

In the use of the device a track layout is shown in FIGURE 15 wherein a pair of rails 33, 33 are shown coupled together at adjacent ends by link members 34 and in which the track shows a turn of about 45° in a given direction (or conversely in the opposite direction, as shown in broken lines in FIGURE 15). In FIGURE 16, a pair of rails 33, 33 are joined in a manner whereby a 90° turn is achieved in a given direction (or again conversely, as shown in broken lines in FIGURE 16). This is brought about by joining two rails at an angle of 45° to each other and of course the idea can be carried out further by making other turns in either direction of the rails over which the carriage travels. Thus, a complete turn in any given direction can be made with the carriage 21.

The carriage 21 is made to follow the track layout pattern of the rails 33 in making these turns in the following manner. By reason of the alignment of the grooves 58' of the caster wheels 58 on the treads 40 of the rails 33 as the carriage is moved along the track 20, if the line of travel is in a straight line, the side rollers 61 will remain essentially clear of the sides of the rails 33, and the forward movement of the carriage 21 will be a linear one in a straight direction. In this condition of straight travel, a particular caster 58 that is passed over a given link member 34 can essentially ride over and not contact the said link member while the rolling support between the carriage 21 and the rails 33 is provided by the oppositely disposed caster 58, which of course remains on the tread 40 of a given rail 33 as the said particular caster 58 leaves that rail 33 and passes over the given link member 34 toward the next adjacent rail 33, the rollers 61 associated with both said casters 58 serving during such transition to prevent any undue misalignment. Howeever, if the line of direction is similar to that shown in FIGURES 15 and 16 of the drawings, the transitional caster 58 can be readily shifted while passing over an olique link member 34 with the aid of the rollers 61 acting against the sides of connecting link member 34 and rail 33 so that the carriage 21 follows across the connecting link member 34 onto the angularly disposed rail 33 and so that the actual direction of travel of the cariage 21 is determined by the particular angular position of the rails and link members joined together to form the track layout.

It will be understood that the tracks are placed in position on the area to be covered by the concrete whether the area is the form of a building or a flat slab laid on the ground. The tracks can therefore be placed in position and, when the area is covered, the carriage can be run onto diagonally disposed tracks or the whole apparatus may be disassembled and reassembled on other tracks prepared to receive the apparatus, and in a few seconds the concrete can be moving over a conveyor to the new location without any material loss of time in furnishing the wet concrete to the conveyor in the erection of a building, a flat slab, or the like. In this way a substantial savings in time may be effected, because the speed with which any job can be completed depends on how quickly material can be moved from one position to another. Therefore, with the system of the present invention loss of time is minimized, and the use of transit mixers and other conventional apparatus used for the production of concrete is rendered unnecessary.

The pouring operation can start with the conveyor in fully extended position through the cantilever action of the roller mountings on the support frame position so that the concrete mix travels the full length of the conveyor before it is discharged. As the pouring progresses the conveyor is longitudinally retracted through yoke 22. If need be, the conveyor can be moved laterally about the vertical axis of shaft 47 on the supporting yoke frame 22 so that concrete mix can be discharged on each side of the conveyor. The arrows in FIGURES 7 and 8 illustrate the universal movement that can be achieved by the conveyor.

In any position in which the conveyor may be placed it will remain in position without auxiliary support. This has many advantages, particularly if the pouring location does not provide adequate areas for positioning stands, which is often the case.

Another and preferred embodiment of the present invention is shown in FIGURES 17–21. The track means 20, carriage 21, and outrigger stabilizing means 52 shown in FIGURE 17 are substantially identical to those described in connection with the embodiment illustrated in FIGURES 1–16. Likewise, the yoke 22 and its associated parts, as well as conveyor 24 are of the structure described previously in detail. However, a new, and somewhat modified support frame 100 is employed. In particular, the means for mounting the supporting frame 100 on the yoke 22 is somewhat different, as is the mode of suspension of the conveyor 24 within the support frame 100, as will all more clearly appear hereinafter.

Support frame 100 comprises a trussed structure that extends outwardly from yoke 22 and which is pivotally mounted adjacent its one end to the side members 69, 68 of yoke 22 by means of a pivot pin 102 which passes through member 69 and a similar pivot pin (not shown) which passes through member 68. Support frame 100 is mounted on yoke 22 in a cantilever fashion as will hereinafter be described in detail.

A bail 104 is secured to the outer end of support frame 100 and extends upwardly from one side thereof and across to the opposite side. A pair of rollers 106 is mounted at the upper side of the support frame and on opposite sides thereof (see especially FIGURE 20) and is adapted to engage the upper flanges 27, 28 of the side members 25, 26 of the conveyor. A similar pair of opposed rollers 108 is provided adjacent the outer ends of the conveyor 24 and is also adapted to engage the upper flanges 27, 28 of conveyor side members 25, 26. Rollers 106, 108 are provided in spaced apart relation to support the conveyor when it is placed in position within the support frame 100, either in its retracted position or in the extended position shown in FIGURE 17.

Support frame 100 has a pair of projecting ends 112, 114 which extend rearwardly of yoke 22 so that a portion of support frame 100 extends to the side of yoke 22 away from bail 104. A pair of opposed lower rollers 116 (only one of which is shown in the drawings) is mounted on support frame ends 112, 114, respectively. A pair of bottom flanges 28', 27' is provided on conveyor side members 25, 26. Bottom rollers 116 ride in bottom flanges 28', 27' and, in cooperation with rollers 106, 108 on which top flanges 28', 27' ride, serve to support the conveyor 24 in a cantilever fashion. Specifically, rollers 106, 108 serve to support conveyor 24 in opposition to the ordinary normal forces of gravity acting downwardly and rollers 116 serve to preclude conveyor 24 from being tilted upwardly when in its extended position. The spaced apart relationship between rollers 106 and 116 is sufficient that a high degree of stability is obtained for the conveyor 24 within the support frame 100.

The support frame 100 is itself stabilized in a cantilever fashion in the following manner. An adjustable brace 120 is pivotally mounted at its one end to bracket 67 on pipe member 66 and at its other end to a cross-brace 122 (which forms a part of the trussed structure of support frame 100 as shown in FIGURES 18 and 19 especially) by means of a bracket 124. Brace 120 is adjustable in length so that various degrees of elevation can be achieved for the support frame 100 and hence the conveyor 24 (e.g., as when the conveyor is used to transport concrete mix to a height of two or three floors).

In contrast to the previously described brace 84 (which is manually adjustable) the length of brace 120 may be adjusted through the operation of semi-automatic power means. As best shown in FIGURES 18 and 19, power means, specifically a reciprocating ball screw actuator 130, are preferably associated with brace 120 for the purpose of effecting an adjustment in the length thereof. The actuator 130 (which is per se old and which, therefore, forms a part of the present invention only in combination with the other novel arrangements specified herein) comprises an electric motor 132 mounted in combination with a gear box 134. Motor 132 is adapted to drive a threaded nut (not shown) provided within a housing 136. A shaft 138 is threadably mounted within the nut (not shown). An adjustable bellows arrangement 140 is provided to keep dirt, grime, concrete mix, and the like out of the operating mechanisms. Motor 132 is reversible so that rotation of the nut in each direction can be achieved. By energizing the motor 132 and thereby rotating the nut in the desired direction, movement of shaft 138 with respect to the main portion of brace 120 may be attained. Thus, by appropriately controlling motor 132, the overall length of the brace 120 may be varied as desired. As a result, the desired angular disposition of support frame 100 may be easily achieved by simply controlling motor 132. Substantial economies in time, effort, and labor may thus be achieved by employing the power means to effect the adjustment of the particular level in which the support frame is positioned.

While the reciprocating ball screw actuator 130 is a preferred power means for achieving adjustment in the level of the support frame, other power attachments which could be employed conveniently in association with the arrangement of the present invention include hydraulic ram, rack and pinion, cable and sheave, and other similar arrangements.

As best shown in FIGURES 17, 20, and 21, power-operated means for extending and retracting the conveyor 24 with respect to the support frame 100 are preferably provided. The power-operated means includes a pair of brackets 140, 140 which are mounted at the top of each side of support frame 100. A pair of cross members 142 is respectively pivoted at one end to brackets 140. At the other end of each member 142, bolt 144 is provided, and the bolt extends through member 142 and is threadably received in another bracket 146 so that the relative position between member 142 and the top of support frame 100 may be varied by rotating the bolt 144 so as to draw the end of member 142 either toward or away from the bracket 146.

A shaft 150 is journaled for rotation at each of its ends in a journal housing 148 provided on each member 142. A pair of friction rollers 152 is fixedly mounted at each end of shaft 150 for rotation therewith. At one end of shaft 150, an electric motor 154 and gear box 156 are mounted. Motor 154 via gear box 156 is adapted to drive shaft 150 and associated rollers 152. Motor 154 is reversible so that wheels 152 may be driven in either direction. When conveyor 24 is positioned on supporting frame 100, wheels 152 contact the upper surface of flanges 27, 28 of conveyor 24. By suitably drawing brackets 142, 142 downwardly by rotating bolts 144, rollers 152 may be brought down into driving contact with flanges 27, 28. Thus, when motor 154 is energized, rollers 152 rotate thereby causing conveyor 24 to move with reference to support frame 100. By controlling the direction of rotation of rollers 152, conveyor 24 thus may either be extended from or retracted within support frame 100. Of course, other driving means (e.g., rack and pinion or chain and sprocket means) may be provided for extending and retracting conveyor 24 in support frame 100.

The combination of the power driven adjustable brace 120 and the power driven arrangement for extending and retracting the conveyor thus permits the overall device to be quickly and easily positioned as desired, both with respect to the position of conveyor 24 within the support frame 100 and with respect to the angular position of the support frame (and hence the conveyor) with reference to the horizontal.

Other power attachments may also be employed in connection with the device of the present invention. For example, the legs 53 on outriggers 52 must be of variable length for use on rough terrain. Thus, power attachments (e.g., hydraulic jacks) could be employed with the outrigger leg 53. Also, added convenience is provided by an automatic reel 160 (mounted on yoke side member 68 by means of a bracket 162) for the cord leading to the motor (not shown) in conveyor 24. Thus, the cord is kept out of the way irrespective of the position of conveyor 24 within support frame 100.

It should be understood that various changes, modifications, and variations of the particular arrangements described herein will be apparent to one skilled in the art. The present invention should not be limited in its application to the details of construction and arrangement of parts specifically described or illustrated herein. For example, while the swing frame arrangement comprising yoke 22, support frame 23, and conveyor 24 has been specifically described as mounted on a carriage 21 adapted to travel along track 20, the swing frame itself can be independently mounted on movable base means, with or without stabilizing outrigger means, as required in a given situation. Thus, the swing frame arrangement may be swivel mounted, for example, on the bed of a truck and may be movable therewith. Thus, it should be understood that the scope of the present invention extends to the unique swing frame combination per se and is not limited to its preferred disclosed use in combination with the respective carriage and track means disclosed herein.

It should further be understood that various changes, modifications, and alterations may be effected in the parts and elements of the described embodiments without departing from the spirit and the scope of the present invention as described in the appended claims.

What is claim is:

1. In a device for transporting concrete mix and the like, the combination comprising:
   track means;
   a movable carriage adapted for movement on the track means adjacent the location at which the transported material is to be deposited;
   a coupling yoke rotatably mounted for movement about a vertical axis upon the movable carriage;
   a support frame assembly mounted adjacent one of its ends upon the rotatable coupling yoke in a cantilever fashion;
   conveyor means;
   anti-friction means mounting the conveyor means on the support frame assembly in a cantilever fashion for longitudinal movement thereon; and
   stabilizing means provided on the carriage and movable therewith and adapted to provide vertical stability to the device for transporting concrete mix and the like.

2. A combination as claimed in claim 1, wherein the support frame assembly is pivotally mounted on the rotatable coupling yoke for movement about a horizontal axis and further comprising means for varying the relative angular disposition of the cantilevered support frame assembly and the rotatable coupling yoke in order to adjust the vertical position of the conveyor means.

3. In a device for transporting concrete mix and the like, the combination comprising:
   track means;
   carriage means movable upon the track means;
   means for stationing the carriage means at predetermined locations on the track means;
   a support frame;
   frame mounting means mounting the support frame in cantilever fashion on the carriage means for pivotal movement about horizontal and vertical axes;
   conveyor means; and
   anti-friction roller means removably mounting the conveyor means on the cantilevered support frame in a cantilever fashion for longitudinal bodily movement thereon.

4. A combination as claimed in claim 3, wherein the frame mounting means comprises a yoke mounted on the carriage means for rotation about a vertical axis, the support frame being pivotally mounted adjacent one of its ends to the yoke for pivotal movement about a horizontal axis, the said support frame being free at its other end.

5. A combination as claimed in claim 3, and further comprising stabilizing means secured to the carriage means and adapted to provide vertical stability to the said device.

6. A combination as claimed in claim 5, wherein said stabilizing means comprises a pair of outrigger members extending from opposite sides of the carriage means.

7. A combination as claimed in claim 6, and further comprising adjustable support members extending from each of the outrigger members.

8. A combination as claimed in claim 3, wherein the carriage means includes casters rotatably mounted in the carriage means and adapted for engagement with the track means, and further comprising means interconnecting the track means and the casters for antifriction rolling contact therebetween.

9. A combination as claimed in claim 8, wherein the interconnecting means includes guide rollers to prevent alignment of the track means and the casters.

10. A combination as claimed in claim 3, wherein the track means comprises:
    a plurality of rail sections; and
    link members for interconnecting juxtaposed rail sections.

11. A combination as claimed in claim 10, wherein the link members are adapted to interconnect juxtaposed rail sections in an oblique manner.

12. A combination as claimed in claim 3, and further comprising power means for effecting longitudinal movement of the conveyor means on the cantilevered support frame.

13. A combination as claimed in claim 3, wherein the anti-friction roller means removably mounting the conveyor means on the cantilevered support frame comprises:
    a plurality of support rollers on each side of the support frame and adapted to support the conveyor means; and
    a hold down roller at each side of the support frame and adapted to maintain the conveyor means in held down engagement with the support rollers.

14. A combination as claimed in claim 13, wherein the support rollers and the hold down rollers on each side of the support frame are disposed in spaced apart relationship on opposite sides of the frame mounting means.

15. A combination as claimed in claim 3, and further comprising adjustable positioning means for selectively varying the angular disposition of the cantilevered support frame relative to the carriage means.

16. A combination as claimed in claim 15, wherein the adjustable positioning means comprises a brace member, and further comprising power means for controlling the adjustable positioning means.

17. In a device for transporting concrete mix and the like, the combination comprising:
    track means;
    carriage means adapted for movement on the track means adjacent the location at which the transported material is to be deposited;
    a support frame;
    frame mounting means mounting the support frame in cantilever fashion on the carriage means for pivotal movement about horizontal and vertical axes; and
    conveyor means; and
    anti-friction roller means removably mounting the conveyor means on the cantilevered support frame in a cantilever fashion for longitudinal bodily movement thereon.

18. A combination as claimed in claim 17, wherein the frame mounting means comprises a yoke mounted on the carriage means for rotation about a vertical axis, the support frame being pivotally mounted adjacent one of its ends to the yoke for pivotal movement about a horizontal axis, the said support frame being free at its other end.

19. A combination as claimed in claim 17, and further comprising stabilizing means secured to the carriage means and adapted to provide vertical stability to the said device.

20. A combination as claimed in claim 19, wherein said stabilizing means comprises a pair of outrigger members extending from opposite sides of the carriage means.

21. A combination as claimed in claim 20, and further comprising adjustable support members extending from each of the outrigger members.

22. A combination as claimed in claim 17, and further comprising power means for effecting longitudinal movement of the conveyor means on the cantilevered support frame.

23. A combination as claimed in claim 17, wherein the anti-friction roller means removably mounting the conveyor means on the cantilevered support frame comprises:
    a plurality of support rollers on each side of the support frame and adapted to support the conveyor means; and
    a hold down roller at each side of the support frame and adapted to maintain the conveyor means in held down engagement with the support rollers.

24. A combination as claimed in claim 23, wherein the support rollers and the hold down rollers on each side of the support frame are disposed in spaced apart relationship on opposite sides of the frame mounting means.

25. A combination as claimed in claim 17, and further comprising adjustable positioning means for selectively varying the angular disposition of the cantilevered support frame relative to the carriage means.

26. A combination as claimed in claim 25, wherein the adjustable positioning means comprises a brace member, and further comprising power means for controlling the adjustable positioning means.

27. In a device for transporting concrete mix and the like, the combination comprising:
    a portable stand adapted to be positioned adjacent the location at which the transported material is to be deposited;
    a support frame assembly;
    frame mounting means mounting the support frame in cantilever fashion on the carriage means for pivotal movement about horizontal and vertical axes;
    conveyor means;
    anti-friction roller means removably mounting the conveyor means on the cantilevered support frame assembly in a cantilever fashion for longitudinal bodily movements thereon; and
    stabilizing means, including outrigger members, attached to the portable stand for imparting vertical stability thereto.

References Cited

UNITED STATES PATENTS

| | | | |
|---|---|---|---|
| 1,259,642 | 3/1918 | Long | 64—2 |
| 1,592,821 | 7/1926 | Chiarelli | 104—120 |
| 1,636,619 | 7/1927 | Archer | 104—23 |
| 2,499,030 | 2/1950 | Moon | 64—17 |
| 2,768,588 | 10/1956 | Robb | 238—10 |
| 3,098,454 | 7/1963 | Maestrelli | 104—247 |

FOREIGN PATENTS 799,747  8/1958  Great Britain.

RICHARD E. AEGERTER, *Primary Examiner.*

EVON C. BLUNK, *Assistant Examiner.*

UNITED STATES PATENT OFFICE
CERTIFICATE OF CORRECTION

Patent No. 3,343,651        Dated September 26, 1967

Inventor(s) J.F. Oury et al

It is certified that error appears in the above-identified patent and that said Letters Patent are hereby corrected as shown below:

Column 12, line 67, after "frame", second occurrence,
insert     --assembly--.

Column 12, line 68, cancel "carriage means"
and substitute --portable stand--.

Signed and sealed this 19th day of February 1974.

(SEAL)
Attest:

EDWARD M. FLETCHER, JR.      C. MARSHALL DANN
Attesting Officer                 Commissioner of Patents